United States Patent
Incesu et al.

(10) Patent No.: US 8,306,123 B2
(45) Date of Patent: Nov. 6, 2012

(54) METHOD AND APPARATUS TO IMPROVE THE CONVERGENCE SPEED OF A RECURSIVE MOTION ESTIMATOR

(75) Inventors: Yalcin Incesu, Stuttgart (DE); Oliver Erdler, Stuttgart (DE)

(73) Assignee: Sony Deutschland GmbH, Berlin (DE)

( * ) Notice: Subject to any disclaimer, the term of this patent is extended or adjusted under 35 U.S.C. 154(b) by 1046 days.

(21) Appl. No.: 12/294,532

(22) PCT Filed: Mar. 30, 2007

(86) PCT No.: PCT/EP2007/002882
§ 371 (c)(1),
(2), (4) Date: Sep. 25, 2008

(87) PCT Pub. No.: WO2007/112974
PCT Pub. Date: Oct. 11, 2007

(65) Prior Publication Data
US 2010/0232509 A1    Sep. 16, 2010

(30) Foreign Application Priority Data

Mar. 31, 2006 (EP) .................................... 06006926

(51) Int. Cl.
*H04N 7/28* (2006.01)
(52) U.S. Cl. .............................. 375/240.16; 375/E7.106
(58) Field of Classification Search ............. 375/240.16, 375/240.26, 240.29, E7.1, E7.104, E7.105, 375/E7.106, E7.123, E7.164, E7.256
See application file for complete search history.

(56) References Cited

U.S. PATENT DOCUMENTS

| 5,193,001 | A | 3/1993 | Kerdranvrat |
| 6,178,265 | B1 | 1/2001 | Haghighi |
| 2003/0063673 | A1 | 4/2003 | Riemens et al. |
| 2003/0163281 | A1* | 8/2003 | Yang .............................. 702/150 |
| 2004/0013199 | A1 | 1/2004 | Winger et al. |
| 2005/0276328 | A1 | 12/2005 | Sakamoto |

FOREIGN PATENT DOCUMENTS

| EP | 0 294 957 | 12/1988 |
| WO | WO 00/14682 | 3/2000 |
| WO | WO 00/70879 | 11/2000 |

* cited by examiner

*Primary Examiner* — Gilberto Barron, Jr.
*Assistant Examiner* — Izunna Okeke
(74) *Attorney, Agent, or Firm* — Oblon, Spivak, McClelland, Maier & Neustadt, L.L.P.

(57) ABSTRACT

A method and apparatus for motion estimation of at least a first and a second image frame by estimating at least one motion vector correlating a portion of pixels of the at least first and second image frame, the first and second image frame being part of an image frame sequence. The at least one motion vector is obtained by a predominant motion detection generating at least one global motion vector based on at least one previously determined motion vector, the previously determined motion vector correlating a portion of pixels of earlier image frames of the image frame sequence, and an estimation estimating the at least one motion vector based on the at least one global motion vector.

26 Claims, 4 Drawing Sheets

| num[13] | mv[13] |
|---------|--------|
| num[0]  | mv[0]  |
| num[3]  | mv[3]  |
| num[9]  | mv[9]  |
| ...     | ...    |
| num[10] | mv[10] |
| num[2]  | mv[2]  |
| num[7]  | mv[7]  |

Comparison Result num[i] >= threshold

| num[0]  | mv[0]  | 1 |
|---------|--------|---|
| num[1]  | mv[1]  | 1 |
| num[2]  | mv[2]  | 1 |
| num[3]  | mv[3]  | 1 |
| ...     | ...    |   |
| num[13] | mv[13] | 0 |
| num[14] | mv[14] | 0 |
| num[15] | mv[15] | 0 |

Index

| num[0] | mv[0] | 0  |
|--------|-------|----|
| num[1] | mv[1] | 1  |
| num[2] | mv[2] | 2  |
| num[3] | mv[3] | 3  |
| ...    | ...   |    |
| num[0] | mv[0] | 13 |
| num[1] | mv[1] | 14 |
| num[2] | mv[2] | 15 |

Fig. 5 blockColNum

| blockLineNum | 0 | 1 | 2 | 3 | 4 | 5 | 6 | 7 | 8 | 9 | ... | Width/meBlockWidth | | | | | |
|---|---|---|---|---|---|---|---|---|---|---|---|---|---|---|---|---|---|
| 0 | 0 | 1 | 2 | 3 | 0 | 1 | 2 | 3 | 0 | 1 | 2 | 3 | | 0 | 1 | 2 | 3 | 0 | 1 |
| 1 | 4 | 5 | 6 | 7 | 4 | 5 | 6 | 7 | 4 | 5 | 6 | 7 | | 4 | 5 | 6 | 7 | 4 | 5 |
| 2 | 8 | 9 | 10| 11| 8 | 9 | 10| 11| 8 | 9 | 10| 11| | 8 | 9 | 10| 11| 8 | 9 |
| 3 | 12| 13| 14| 15| 12| 13| 14| 15| 12| 13| 14| 16| | 12| 13| 14| 15| 12| 13|
| 4 | 0 | 1 | 2 | 3 | 0 | 1 | 2 | 3 | | | | | | | | | | | |
| 5 | 4 | 5 | 6 | 7 | 4 | 5 | 6 | 7 | | | | | | | | | | | |
| 6 | 8 | 9 | 10| 11| 8 | 9 | 10| 11| | | | | | | | | | | |
| 7 | 12| 13| 14| 15| 12| 13| 14| 15| | | | | | | | | | | |
| 8 | 0 | 1 | 2 | 3 | | | | | | | | | | | | | | | |
| 9 | 4 | 5 | 6 | 7 | | | | | | | | | | | | | | | |
|   | 8 | 9 | 10| 11| | | | | | | | | | | | | | | |
|   | 12| 13| 14| 15| | | | | | | | | | | | | | | |

| 0 | 1 | 2 | 3 |
|---|---|---|---|
| 4 | 5 | 6 | 7 |
| 8 | 9 | 10| 11|
| 12| 13| 14| 15|

Height/meBlockHeight

| 0 | 1 | 2 | 3 | 0 | 1 |
|---|---|---|---|---|---|
| 4 | 5 | 6 | 7 | 4 | 5 |
| 8 | 9 | 10| 11| 8 | 9 |
| 12| 13| 14| 15| 12| 13|

METHOD AND APPARATUS TO IMPROVE THE CONVERGENCE SPEED OF A RECURSIVE MOTION ESTIMATOR

TECHNICAL FIELD OF THE INVENTION

The present invention relates to a method and an apparatus for picture improvement and in particularly in the field of video coding and compression and/or motion compensated frame rate conversion. Moreover, the present invention relates to a method and an apparatus for motion vector field post processing to improve the convergence speed of a recursive motion estimator.

A motion estimator provides motion vectors and/or, after an analysis, a motion model, wherein the motion model basically reflects camera motions such as dolly (forward, backwards), track (left, right), boom (up, down), pan (left, right), tilt (up, down) and/or roll (along the view axis). There are different ways of motion estimation with various applications: it may be used for coding or for motion compensated frame rate conversion or for global motion compensation.

The detection of global motion in a recursive motion estimator is a known approach. Example vectors are taken out of an estimated motion vector field and are used to solve a set of equations, which define a parametric motion model. The vector field is sampled at for example 9 equally distributed locations. These 9 motion vectors are taken to solve a 4-parameter equation system. This motion model provides one single global motion vector, which can be used during the motion vector process; but only if the parameters of the motion model are determined well according to quality criteria. Since the quality criteria are very strict and decide if the global motion vector is good enough, the global motion vector is not used often enough.

The reason for this is that the samples in the motion vector field are on fixed positions, which cover not necessarily the points, where global motion happens. They can e.g. sample vectors, which relate to local motion.

The problem to be solved is to improve the convergence speed of a recursive motion estimator. In case of very fast and sudden global motion scenes, the motion estimator cannot catch the motion over the complete picture scene. This results in visible picture artifacts due to a failed motion compensation process.

SUMMARY

It is an objective of the present invention to provide a method and an apparatus operable to support a recursive motion estimation process.

Another object is to improve the convergence speed of a motion estimator.

Another object is to improve the motion estimation method for motion compensated frame rate conversion.

Another objective of the invention is to improve image quality of video signals.

These objectives are solved by a method for motion estimation of at least a first and a second image frame by estimating at least one motion vector correlating a portion of pixels of said at least first and second image frame, said first and second image frame being part of an image frame sequence, wherein said at least one motion vector is obtained by:

a predominant motion detection step for generating at least one global motion vector based on at least one previously determined motion vector, said previously determined motion vector correlating a portion of pixels of earlier image frames of said image frame sequence, and an estimation step for estimating said at least one motion vector on the basis of said at least one global motion vector.

Favourably, said predominant motion detection step comprises a histogram step for forming a histogram on the basis of said at least one motion vector, a filtering step for filtering said at least one motion vector on the basis of said histogram, and a distribution step for distributing the at least one filtered motion vector over at least a portion of said at least second image frame.

Favourably, the histogram step, the filtering step and the distribution step of said predominant motion detection step are performed in relation to at least one characteristic of said at least one motion vector, said characteristics being represented by said histogram.

Favourably, said motion vector is describing the change of pixel characteristics within two frames.

Favourably, said distribution step is using a predominant predictor field describing a global motion of said at least a portion of said image frame.

Favourably, said histogram step comprises a histogram calculation step for processing said at least one motion vector into a histogram and a histogram analysis step for extracting characteristics out of said histogram.

Favourably, said filtering step comprises a sorting step for sorting said motion vectors,
a binarization step for selecting none or at least one of said sorted motion vectors, and
a substitution step for substituting specifically said none or at least one selected motion vector by none or at least one non-selected motion vector.

Favourably, said binarization step is selecting by means of a filtering parameter.

Favourably, said distribution step distributes said filtered motion vectors spatial equally.

Favourably, said method comprises a segmentation step for detecting at least one segment of said image frame, wherein said at least one segment is characterised by a specific distribution of motion vectors and/or pixel characteristics.

Favourably, said method comprises a motion model classification step for detecting motion models of motion vectors.

Favourably, said motion models comprise tilting, panning, zooming, rotations, chaotic and/or complex motions.

Favourably, the distribution step distributes motion vectors dependent on the maximum occurrences of said motion vector or on the segment or on the calculation per position.

Favourably, a method for processing video signals into motion vector fields comprises a motion estimation step for receiving and processing input video signals and predominant predictor fields, and outputting motion vector fields, and a predominant motion detection step for applying above-mentioned method, wherein said method is operable to receive and process said motion vector fields, and output said predominant predictor fields.

Favourably, a method for processing video signals comprises a video processing step for receiving and processing input video signals and motion vector fields, and outputting video signals, and above-mentioned method for receiving and processing input video signals, and outputting motion vector fields.

Furthermore the above-mentioned objectives are also solved by an apparatus adapted for motion estimation of at least a first and a second image frame, said apparatus estimating at least one motion vector correlating a portion of pixels of said at least first and second image frame, said first and second image frame being part of an image frame sequence, wherein said apparatus comprises:

a predominant motion detector operable to generate at least one global motion vector based on at least one previously determined motion vector, said previously determined motion vector correlating a portion of pixels of earlier image frames of said image frame sequence, and a motion estimator system operable to estimate said at least one motion vector on the basis of said at least one global motion vector.

Favourably, said predominant motion detector comprises a histogram device operable to form a histogram on the basis of said at least one motion vector, a filtering device operable to filter said at least one motion vector on the basis of said histogram, and a distribution device operable to distribute the at least one filtered motion vector over at least a portion of said at least second image frame.

Favourably, the histogram device, the filtering device and the distribution device of said predominant motion detector are operable to perform in relation to at least one characteristic of said at least one motion vector, said characteristics being represented by said histogram.

Favourably, said motion vector is describing the change of pixel characteristics within two frames.

Favourably, said distribution device is operable to use a predominant predictor field describing a global motion of said at least a portion of said image frame.

Favourably, said histogram device comprises a histogram calculation device operable to process said at least one motion vector into a histogram and a histogram analysis device operable to extract characteristics out of said histogram.

Favourably, said filtering device comprises a sorting device operable to sort said motion vectors, a binarization device operable to select none or at least one of said sorted motion vectors, and a substitution device operable to substitute specifically said none or at least one selected motion vector by at least one of said non-selected motion vector.

Favourably, said binarization device is operable to select by means of a filtering parameter.

Favourably, said distribution device is operable to distribute said filtered motion vectors spatial equally.

Favourably, said apparatus comprises a segmentation device operable to detect at least one segment of said image frame, wherein said at least one segment is characterised by a specific distribution of motion vectors and/or pixel characteristics.

Favourably, said apparatus comprises a motion model classification device operable to detect motion models of motion vectors.

Favourably, said motion models comprise tilting, panning, zooming, rotations, chaotic and/or complex motions.

Favourably, said distribution device is operable to distribute motion vectors dependent on the maximum occurrences of said motion vector or on the segment or on the calculation per position.

Favourably, an apparatus operable to process video signals into motion vector fields comprises a motion estimation device operable to receive and process input video signals and predominant predictor fields, and output motion vector fields, and a predominant motion detection device comprising an above-mentioned apparatus, wherein said apparatus is operable to receive and process said motion vector fields, and output said predominant predictor fields.

Favourably, a system operable to process video signals comprises a video processing device operable to receive and process input video signals and motion vector fields, and output video signals, and an above-mentioned apparatus, wherein said apparatus is operable to receive and process input video signals, and output motion vector fields.

It is already known that the determination of the global motion, which may come from a camera move, and the usage of a global motion vector as a candidate predictor in the motion estimation process can improve the resulting motion vector field. The basic idea of this invention is to use not only one single motion vector type to describe the global motion but to determine with an reliable and robust process a certain number of predominant vector types which are used as predictors for the motion estimation process. Further it is important how these predominant motion vectors are actually used in the motion estimation process. A good solution has been achieved by generating a predictor field, which contains the different predominant motion vectors in a spatial equally distributed order.

BRIEF DESCRIPTION OF THE DRAWINGS

The above and other objects, features and advantages of the present invention will become more apparent from the following detailed description when taken in conjunction with the accompanying drawings, in which.

DETAILED DESCRIPTION OF EMBODIMENT

Figure 1:
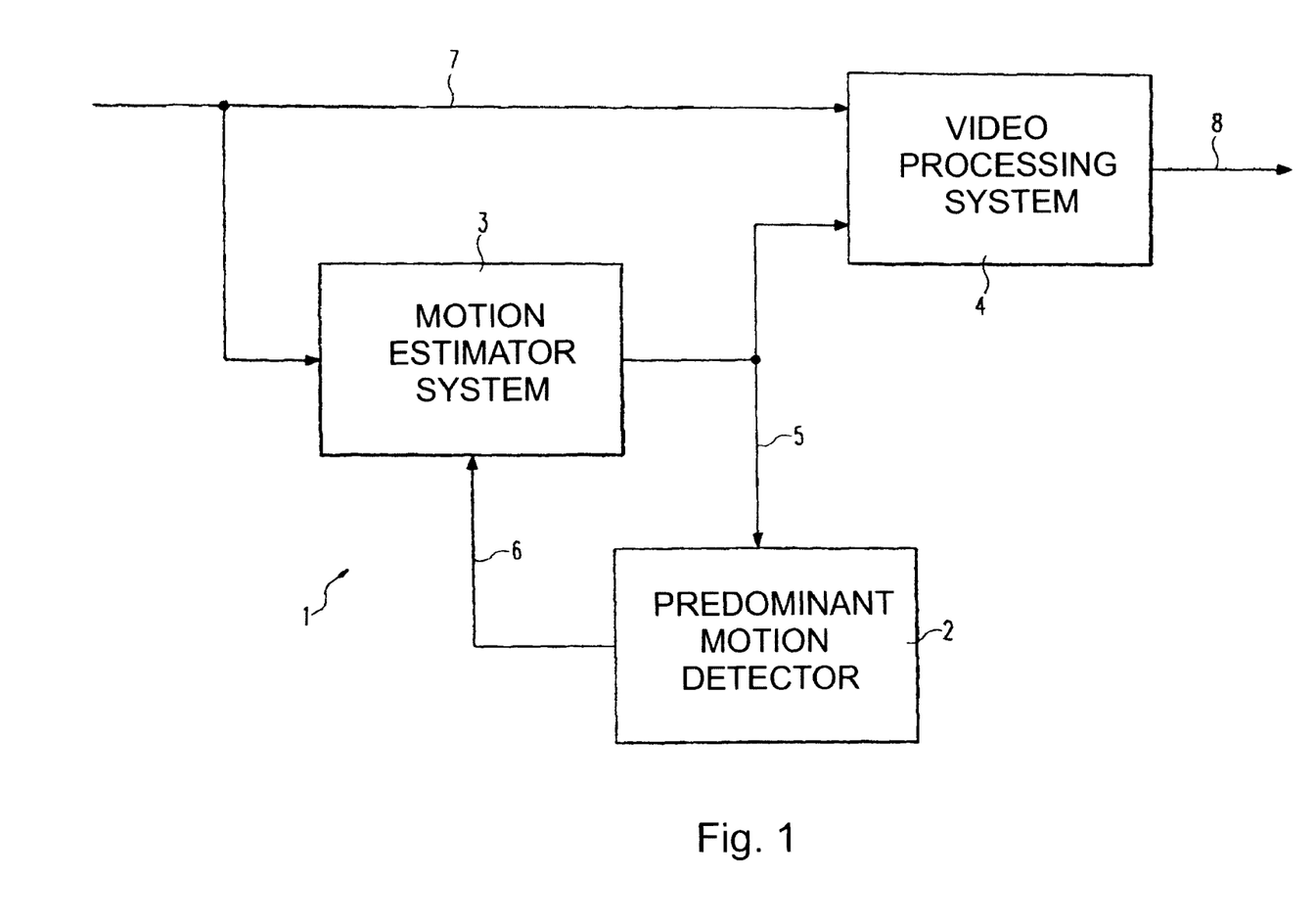
FIG. 1 shows an example of a schematic block diagram of a motion compensated frame rate conversion system comprising an embodiment of the present invention.

FIG. 1 shows an example of a schematic block diagram of a motion compensated frame rate conversion system 1 comprising an embodiment of the present invention, said system 1 is operable to receive and process input video signal 7 and output video signal 8. The input video signal 7 comprises data which may be uncompressed or already compressed, while the output video signal 8 comprises (further/additionally) compressed and/or converted data. Said system 1 comprises a predominant motion detector 2, a motion estimator system 3 and a video processing system 4.

The input video signal 7 comprises data of at least a group of pictures and/or motion vectors, whereby said group of pictures comprises at least a first and a second image frame and might be part of a image frame sequence.

The motion estimator system 3 is operable to receive data comprising the input video signal 7 and the predominant predictor field 6 sent by the predominant motion detector 2, process said data 6 & 7 and output a motion vector field 5 to the video processing system 4 and/or the predominant motion detector 2. Said motion vector field 5 comprises motion vectors describing the change of all pixels of two successive image frames, whereby the motion vector might point either to the preceding or to the succeeding image frame. As known to a skilled person the motion vector field 5 might only comprise at least one vector describing the displacement of at least one pixel of two successive image frames; or at least of frames that are temporally apart. Moreover, a motion vector can also describe the displacement of objects of an image frame, said object might be a segment(s) having the same and/or specific pixel characteristics and/or other properties known to a skilled person. For example a car, a person, a tree and other items known to a skilled person are objects, whose movement caused by the objects movement and/or the movement of a camera can be described by said motion vector.

These motion vectors as well as the later described global motion vectors allow to render a prediction of the movement of a pixel between two image frames. There are temporal and spatial predictions, whereby the temporal predictions are estimation results from previous estimations and the spatial predictions are estimation results from the current estimations, said estimation being generated by said motion estimator system. The global motion vectors are additionally created predictors, which might base on the previous and/or the current estimation. A predictor is recursively optimized vector which was previously found and is based on previously determined motion vectors. The 3D recursive search uses spatial and temporal predictions to generate motion vector in a list, whereby the motion vector fitting best to the actual motion vector correlating a first and a second image is acquired.

The motion vector of the motion vector field 5 is calculated based on temporal, spatial and/or global motion predictions, respectively. The initial motion vectors required to determine said predictions might nevertheless be calculated by the motion estimator system 3 in e.g. a block matching algorithm. Since the subject-matter is a recursive method, the 3D recursive search is used for the block matching. For the block matching algorithm the SAD (summed absolute difference) or the MSE (mean squared error) criterion is used to find the motion vector describing the best match of the pixel block.

In detail the motion estimator system is operable to estimate at least one motion vector on the basis of at least one global motion vector.

The video processing system 4 is operable to receive data comprising the input video signal 7 and the motion vector field 5 from the motion estimator system 3, process said data 5 & 7 and output the output video signal 8. As known to a skilled person some image frames are substituted by said motion vector field 5 to estimate the following or previous frame and thus compress the video data of a movie. The motion compensated frame rate conversion system 1 can be applied to e.g. frame conversion, encoding and decoding, respectively.

Figure 2:
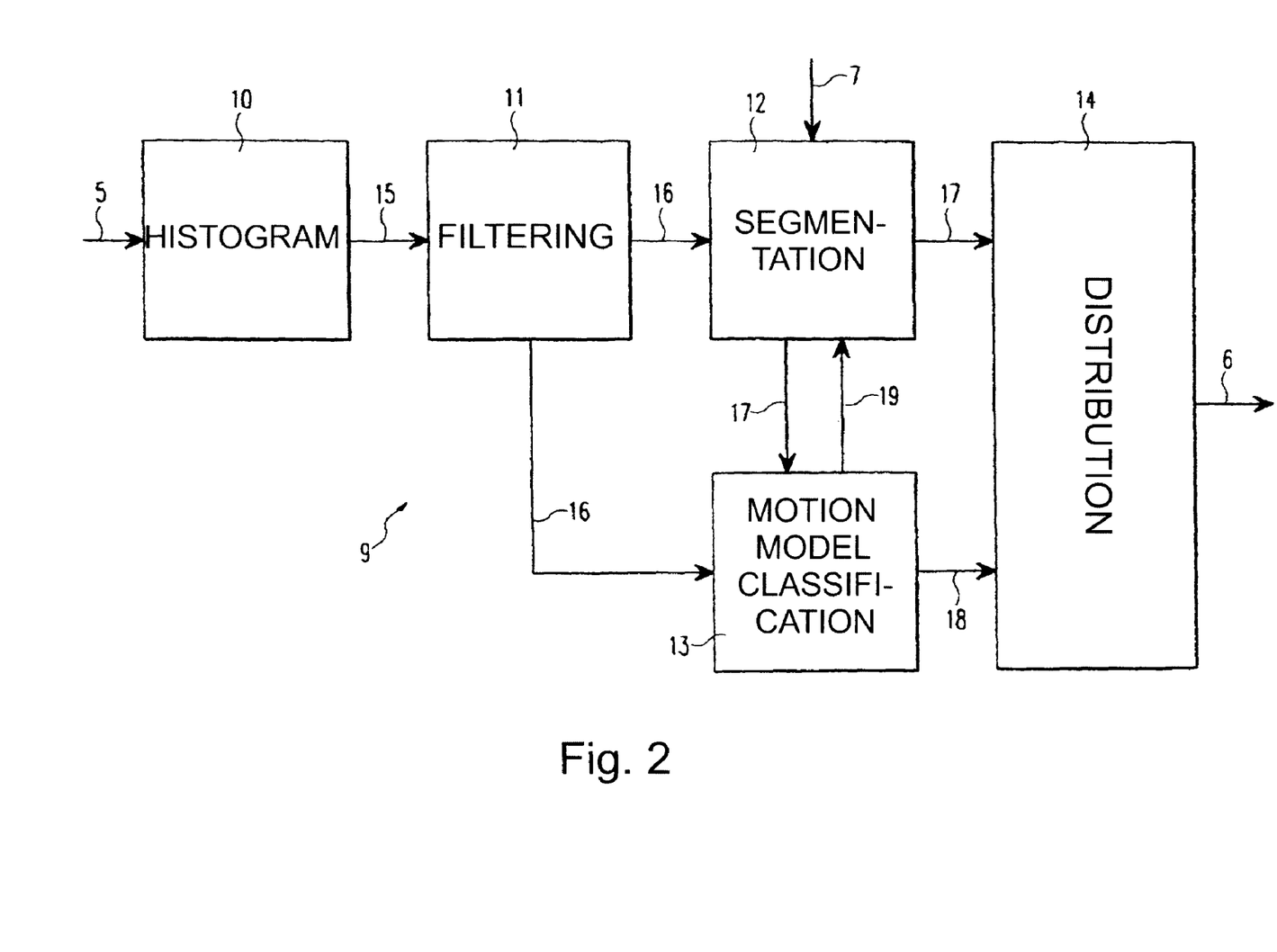
FIG. 2 shows a schematic block diagram of an embodiment of the present invention.

The predominant motion detector 2 is operable to receive data comprising the motion vector field 5 sent by the motion estimator system 3, process said data 5 and output the predominant predictor field 6 to the motion estimator system 3. FIG. 2 describes, that the received data also comprises the input video signal 7 which is not explicitly shown in FIG. 1.

In more detail the predominant motion detector is operable to generate at least one global motion vector based on said at least one previously determined motion vector, said previously determined motion vector correlating a portion of pixels of earlier image frames of said image frame sequence. Earlier image frames might e.g. comprise a first and a preceding image frame. It has to be noted that the second image frame is succeeding to the first image frame, meaning after the first image frame.

The predominant predictor field 6 describes the global motion of the pixels in the frames and comprises at least one predominant motion vector, whereby said predominant motion vectors are based on the vectors of at least a specific portion of the motion vector field 5. This predominant predictor field 6 is operable to provide at least one predominant motion vector for a respective pixel or a block of pixels within an image frame, whereby said predominant motion vector is operable as a predictor as explained above. The better and more accurate the prediction, the less motion vectors will be needed to be calculated for creating the next image frame and the faster the motion estimation converges to the actual motion vector. Said global motion comprises and describes e.g. translations, rotations, zooming and/or other motions known by a skilled person. Furthermore the predominant motion vectors are derived from the motion vector field 5 from a previous processing iteration of the motion estimator system 3 in order to save resource complexity. Nevertheless, other origins of the motion vector field 5 are possible like e.g. said motion vector field 5 being based and/or a portion of said input video signal 7.

The detector 2 can be seen as an extension to the motion estimator system 3 in order to improve the output picture quality and reduce the bit rate in video coding by faster converging motion estimation. By providing the global motion vectors, also called predominant motion vectors, global motion predictions can be made in the detector 2, which help to faster converge the motion estimation. The main advantageous differences between the invention and the state of the art are:

Visible improvement of the picture quality when applying this feature to the motion estimator.

Not only one motion vector for description of the global motion is used. This improves also the estimation on local motion of large objects.

The system 1, in particular said detector 2, is easy to implement in hardware and/or software; thus the embodiment of the present invention is feasible as an apparatus and/or a method.

Eventually the motion vector field 5 comprises motion vectors based on the signal input 7 and/or the predominant predictor field 6. To provide true-motion estimation, the true motion vector has to be calculated. Instead of actually calculating the true motion vector by e.g. a block matching algorithm, a prediction of said vector can be performed which requires less computing power.

This prediction is done by means of the predominant motion vectors of the predominant predictor field 6, which provide additional prediction for the movement of the respective pixels according to the actual/true motion vector. Of course since the motion estimator system 3 also calculates the spatial and/or the temporal predictors, the overall prediction of the true motion vector is more accurate and converges much faster.

The combination of predominant motion detector and the motion estimator system, as shown in FIG. 1, is adapted for motion estimation of at least a first and a second image frame by estimating at least one motion vector correlating a portion of pixels of said at least first and second image frame, said first and second image frame being part of an image frame sequence.

Essentially, the predominant motion detector is operable to calculate global motion vectors provided in predominant predictor fields, whereby said global motion vectors base on motion vectors of previous image frames like e.g. of the first frame and a preceding frame of said first frame. The motion estimator system is operable to calculate the motion vector based on said global motion vectors on the basis of said motion vectors of said previous image frames.

FIG. 2 shows an embodiment of the present invention comprising a predominant motion detector 9, said detector 9 comprising a histogram element 10, a filtering element 11, a segmentation element 12, a motion model classification element 13 and a distribution element 14. The predominant motion detector 9 is the same as the one described in FIG. 1.

The histogram element 10 is operable to calculate and output data 15 of a histogram comprising its characteristics and motion vectors, said data being based on the received motion vector field 5. This motion vector field 5 is the same as described in FIG. 1.

The filtering element 11 is operable to receive and process said data 15, and output data of predominant motion vector field 16. An example of an filtering element 11 is described later in more detail in FIG. 3. The processing in element 11 comprises elements for filtering, cleaning and/or additional processing elements known to a skilled person for processing of the histogram 15 to excerpt said data of predominant motion vector field 16. The predominant motion vector field 16 bases on said data 15. In case of a linear translation one predominant motion vector can be calculated, but considering e.g. rotation motions there will be a different specific distribution of different predominant motion vectors. For example when a object is rotating with its rotation axis pointed towards the camera, there will be an equal distribution of different predominant motion vectors for the area of this object. For a rotation there are global motion vectors which are tangential aligned like on the edge of a circle, whereby the axis of the center of the circle corresponds to the rotation axis of the object or the camera. The global motion vectors are all aligned to form a clockwise or counterclockwise rotation. While the global motion vectors nearer to the axis are shorter, the global motion vectors further away will be longer.

The segmentation element 12 is operable to identify segments in a video frame of the video signal and output data 17 of segment representatives, said segments having characteristics like for example comprising the same and/or similar motion vectors and/or similar pixel luminescence and/or other characteristics known to a skilled person. Also specific distribution(s) of predominant motion vectors are characteristics of segments like e.g. in a rotation. Therefore the incoming data comprises the predominant motion vector field 16 and, if necessary for comparison of pixel characteristics, the input video signal 7. Said pixel characteristics describes the pattern, lumineszenz, colour and/or contrast e.g. of said pixel and/or among pixels of the same or different frames.

The motion model classification element 13 is operable to identify specific global motions like for example zooming, rotations, panning and other motions known to a skilled person. A motion model can be identified by the distribution of predominant motion vectors 16 also called global motion vectors and thus depends on the distribution of the motion vectors within the histogram and the position of the motion vector within the frame. According to this analysis, specific data 18 is sent to the generate predictor element 14 to support the selection process of the predictors, said data 18 comprises a motion model identification. The segmentation element 12 is provided with data 19 of motion segment from said element 13, said data 19 predicting a segment which was identified due to its unique global motion like e.g. rotations.

The distribution element 14 is operable to generate and output predominant predictor fields 6. The generation of the fields 6 bases on one or several criteria like the one described in FIG. 3, wherein the maximum number of occurrences of a motion vector is key value responsible for selecting said predominant motion vectors. Moreover, the generation is alternatively based on other criteria like for example on the segment representatives via data 17 or of the calculated predictors per position.

Another criteria bases on the data 18 comprising the classified type of motion, whereby the predominant predictor vectors 6 per estimation position can now be generated and/or the distribution pattern of the predominant predictor vectors 6 can be reconsidered.

Figure 3:
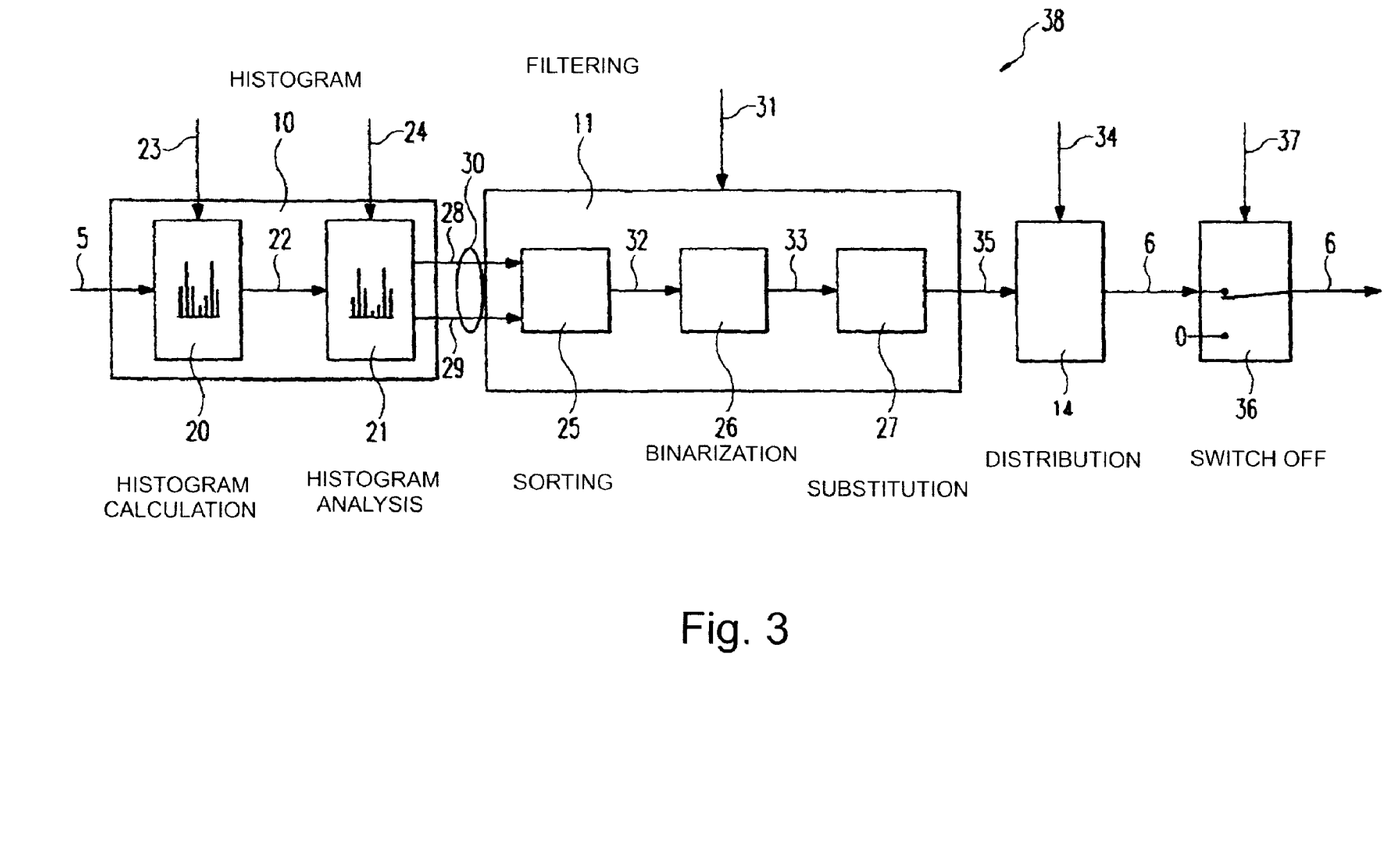
FIG. 3 shows a schematic block diagram an alternative embodiment of the present invention.

FIG. 3 shows an alternative embodiment of the present invention comprising a predominant motion detector 38, said detector 38 being operable to calculate predominant predictor field 6 based on motion vector field 5. The detector 38 is the same as the predominant motion detector 2 described in FIG. 1 and comprises the histogram element 10, filtering element 11, distribution element 14 and switch off element 36. The histogram element 10 comprises a histogram calculation element 20 and a histogram analysis element 21. The filtering element 11 comprises a sorting element 25, a binarization element 26 and a substitution element 27. All elements mentioned both in the description of FIGS. 2 and 3 are the same. All parameters mentioned in all Figures are preset and/or flexibly changeable.

The histogram calculation element 20 is operable to receive a motion vector field 5, and generate a two-dimensional histogram 22 of said motion vector field 5 by counting the number of occurrences for each motion vector mv=(mv$_x$, mv$_y$), respectively. The parameter of said motion vectors mv$_x$ and mv$_y$ describe the respective component length of the vector in the X-Axis and Y-Axis. The motion vector field 5 is the same as the one described in FIG. 1 or 2. It is possible to choose here other types of histograms, which could be configured by a histogram calculation parameter 23. Other alternative examples are possible using separate histograms for mv$_x$ and mv$_y$ and/or even histograms of more than two dimensions, wherein for example spatial and/or temporal dependencies of a vector or of the ones in the neighborhood are also considered.

The histogram analysis element 21 is operable to receive the two-dimensional histogram 22 and to find a specified number of maxima in the histogram 22, wherein the maxima selection is determined by a histogram analysis parameter 24. Other parameters 24 being operable not only for maxima selection are possible. The output of this element 21 is an unsorted list 30 comprising parameter 28 and 29, said parameter 28 being the actual number of occurrences of the respective motion vector and said parameter 29 being the motion vector itself or a value identifying the vector. The list 30 might comprise other parameters in reference to the dimensions and/or parameters of said histogram. The motion vector mv=(0,0) is not considered because this is anyway a default candidate in each motion estimation system and is therefore not of interest in this element.

The filtering element 11 is operable to apply a histogram post processing to the resulting data of said unsorted list 30, in particular to sort and filter out motion vectors, which are not considered as predominant because their number of occurrences is lower than a filtering parameter 31, which is a preset or flexibly settable threshold value. Other parameters 31 being operable for filtering according to other characteristics other than the number of occurrences are possible. If no motion vector 29 has a higher number of occurrences 28 than said parameter 31, the list 30 is taken as it is because it may be for example a zoom or rotation. The output of the element 11 is a list 35 of predictors, which contains the predominant motion vectors beginning with the most dominant one and which is eventually substituted, indexed and sorted.

Essentially linear and/or non-linear filtering can be applied by the filtering element 11. By filtering, faulty calculated predictors and thus motion vectors can be filtered out, thus maintaining the system stabile. The segmentation of the histogram is an example of non-linear filtering.

The sorting element 25 is operable to sort the list 30 by parameter 28 and output the sorted list 32. Other parameters than the number of occurrences 28 output by element 10 can be considered for sorting said list 30. As later shown in FIG. 4 as an example, the motion vector having the highest number of occurrences is at the top of the list, while the other motion vectors are listed in a descending order.

The binarization element 26 is operable to apply the parameter 31 to this sorted list 32, which leads to a binarization of said list 32, in particular of the predominant motion vectors 29 according to their number of occurrences 28 and said parameter 31. Binarization means that an additional index for every predominant motion vector 29 is implemented into list 32, thus said list 32 being processed to an indexed & sorted list 33. By specifically indexing a predominant motion vector 29, said vector 29 is then selected for substitution process later described. If the parameter 28 is greater or equal to parameter 31, the comparison index of the specific predominant motion vector 29 is set to 1, otherwise it is set to 0.

The substitution element 27 is operable to substitute data sets of list 33 comprising the parameter 28 and 29 and their indices with data sets from the top of the list 33, when the index is equal to 0. Generally said every predominant motion vector 29 which was selected in the binarization element 26 is substituted by a non-selected and/or predetermined motion vector. If no predominant motion vector 29 is selected, then no predominant motion vector may be substituted or all of them can be substituted. In this case the data from the top of the list comprise the most dominant motion vectors and substitute the less dominant motion vectors from the bottom of the list, but the scope of the invention is not limited to this example. The list 33 is processed to list 35 in element 27 by finally indexing the motion vectors 29 with ascending numbers. The data samples shown in and described by FIG. 4 depict the processing elements 25 to 27 in more detail.

Figure 5:
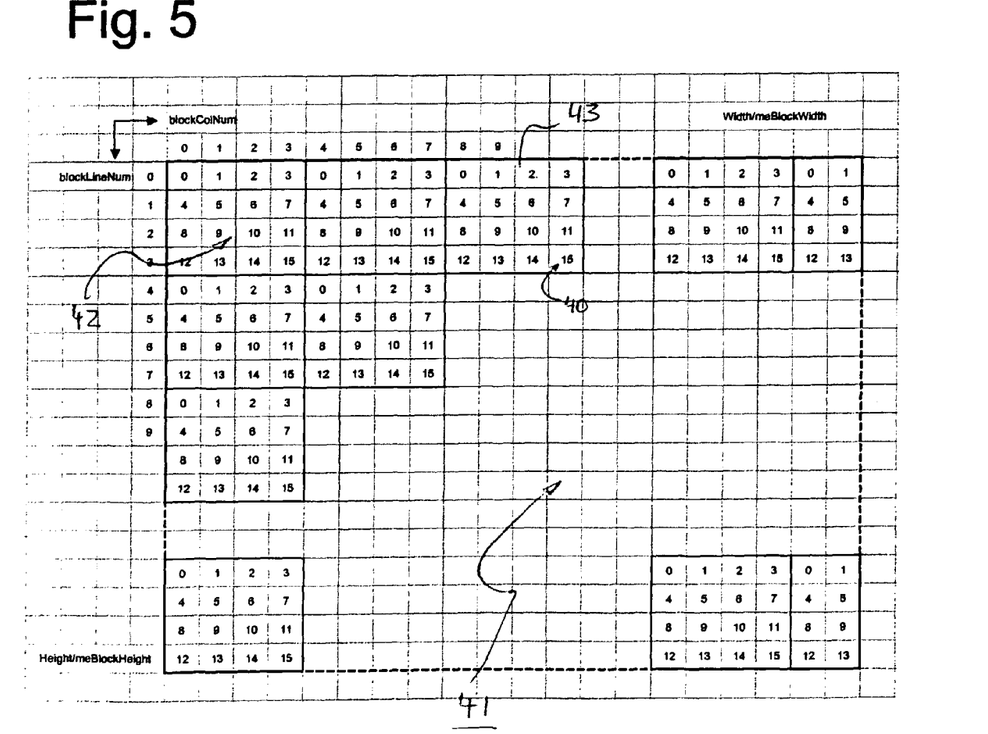
FIG. 5 shows an example of distributed predominant motion vectors over an image, is shown.

The distribution element 14 is operable to apply the predominant motion vectors of the list 35 to the motion estimation process in a way that each vector in the list 35 is spatial equally distributed over the whole picture. FIG. 5 shows an example of a pattern how the predominant motion vectors can be distributed into a predominant predictor field 6.

The switch off element 36 is similar to a switch and operable to output either the previously distributed and predominant motion vectors as said predominant predictor field 6 or data containing only the zero vector to the motion estimator system 3 described in FIG. 1. In case the system 3 does not have the capability to process the predominant motion vectors, the user does not want to apply the global motion estimation or any other possible situation known to a skilled person, the predominant motion detector 38 is turned or cut off by means of said element 36. A switch off parameter 37 is operable to control said element 36.

Figure 4:
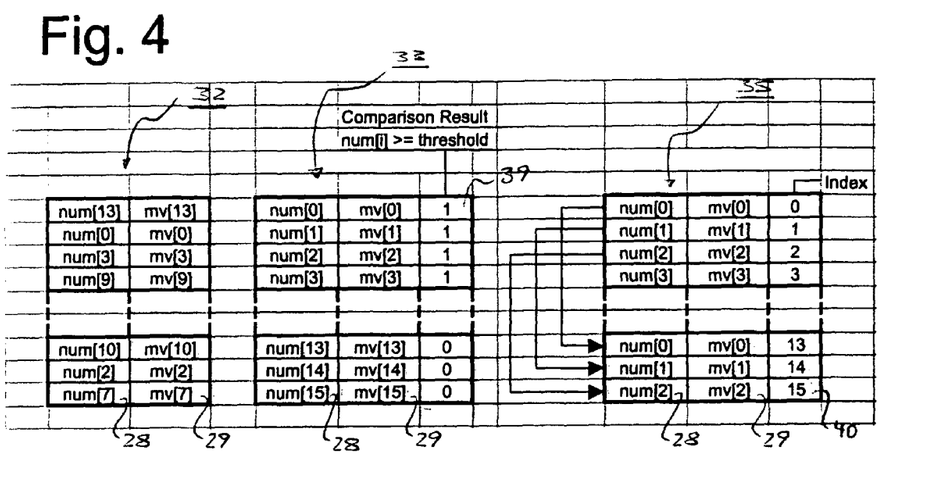
FIG. 4 shows data samples of a filtering element, said element being a portion of an embodiment of the present invention.

FIG. 4 shows examples of three different tables 30, 33 and 35, all tables comprising at least two columns of data samples. One column comprises the parameter 28 identifying the actual number of occurrences of the respective motion vector and the other column comprises the parameter 29 identifying the motion vector itself. The motion vector 29 mv[i] is always mapped to its respective number of occurrences 29 num[i], like for example mv[0] is located in the same row as num[0]. In this example the parameter num[i] has the highest number, when the index is the lowest; but the scope of the invention is not limited to this example. The tables 30 and 35 are the same as the data 15 and 16, respectively, described in FIG. 3.

Table 30 is an unsorted list, which is sent to element 11, in particular to element 25 described in FIG. 3. The table 30 has no intentional specific order or sorting along the column except for the above-mentioned mapping of the rows. The first row comprises the values num[0] and mv[0], whereby all rows comprise examples.

Table 33 is the result of the sorting element 25 and the binarization element 26 described in FIG. 3. The motion vectors 29 mv[i] are sorted by their respective number of occurrences 28 num[i], descending from the highest number. Afterwards a new column is added to the table comprising the result of a comparison between the number num[i] and the filtering parameter 31, said parameter 31 being described in FIG. 3. If the num[i] is greater or equal to parameter 31, the additional entry in the row of num[i], a comparison index 39, is set to 1, otherwise it is set to 0. As known to a skilled person, other allocations and comparisons are possible to mark specific motion vectors. The first row comprises the values num [0], mv[0] and the comparison index set as 1, whereby all rows comprise examples.

Table 35 is the result of the substitution element 27 described in FIG. 3. The motion vectors 29, which were marked with the additional entry in the row (in this case with a zero in the comparison index 39), are now successively substituted by the motion vectors 29 mv[i] and their respective number of occurrences num[i] descending from the most dominant motion vector 29 according to the number of occurrences 28 num[i]. Moreover, every row is now indexed by an order index 40 in ascending order until a predetermined number, said number depending on the block size described later in FIG. 5. In FIGS. 4 and 5 the indices range from 0 to 15, but are not limited to this example. The first row of table 35 comprises the values num[0], mv[0] and the order index set as 0, whereby all rows comprise examples.

FIG. 5 shows an example of an image frame 41 that shows the distribution of the indices 40 of the predominant motion vector list 35 over the complete image frame 41. The list 35 is the same as the list 16 described in FIG. 2. Every index stands for a predictor motion vector of list 35 described in FIG. 3 or 4. Since the motion estimation process is block based, one entry in the list is used as predictor for the estimation process of one block 42. The picture 41 shows an example of 16 predominant vectors, said vectors being indexed from 0 to 15. The pattern is arranged in a way that the vector list 35 is distributed over the predictor field in blocks 42 according to their index 40. This results in a spatial equally distribution over the whole image frame 41, which is advantageous for the estimation process.

At the right border of the image frame 41 only half of the block 42 of the predominant vectors is inserted, since the frame 41 is not broad enough. Nevertheless every pixel 43 in the frame 41 is associated with a predominant predictor vector of list 35 according to the spatial equally distribution to estimate the global motion.

The invention claimed is:

1. A method for motion estimation of a first image frame and a second image frame, comprising:
   estimating a motion vector correlating a portion of pixels of the first and second image frame, the first and second image frame being part of an image frame sequence, wherein:
   the motion vector is obtained by a predominant motion detection generating a global motion vector based on a previously determined motion vector, the previously determined motion vector correlating a portion of pixels of earlier image frames of the image frame sequence;
   the estimating the motion vector is performed on the basis of the global motion vector; and
   the predominant motion detection comprises:

forming a histogram on the basis of the motion vector,
filtering the motion vector, from among a plurality of motion vectors, on the basis of the histogram, the filtering comprising:
sorting the motion vectors;
selecting, in a binarization, the motion vector from the sorted motion vectors; and substituting the motion vector, which is selected in the binarization, with a non-selected motion vector of the sorted motion vectors or a predetermined motion vector; and
distributing the motion vector, which is substituted as a result of the filtering, over at least a portion of the second image frame.

2. A method according to claim 1, wherein: the forming the histogram, the filtering, and the distributing are performed in relation to at least one characteristic of the motion vector, the characteristics being represented by the histogram.

3. A method according to claim 1,
wherein the motion vector describes a change of pixel characteristics within two frames.

4. A method according to claim 1, wherein the distributing uses a predominant predictor field describing a global motion of the at least a portion of the second image frame.

5. A method according to claim 1, wherein the forming a histogram comprises:
processing the motion vector into a histogram; and
extracting characteristics out of the histogram.

6. A method according to claim 1, wherein the binarization comprises selecting by a filtering parameter.

7. A method according to claim 1, wherein the distributing distributes a plurality of filtered motion vectors spatial equally.

8. A method according to claim 1, further comprising:
a segmentation detecting at least one segment of an image frame,
wherein the at least one segment is characterized by a specific distribution of motion vectors or pixel characteristics.

9. A method according to claim 1, further comprising:
a motion model classification detecting motion models of motion vectors.

10. A method according to claim 9,
wherein the motion models comprise tilting, panning, zooming, rotations, chaotic, and/or complex motions.

11. A method according to claim 8,
wherein the distributing distributes motion vectors dependent on maximum occurrences of the motion vector or on a segment or on a calculation per position.

12. A method for processing video signals into motion vector fields comprising:
a motion estimation for receiving and processing input video signals and predominant predictor fields, and outputting motion vector fields;
a predominant motion detection comprising:
forming a histogram on the basis of a motion vector,
filtering the motion vector, from among a plurality of motion vectors, on the basis of the histogram, the filtering comprising:
sorting the motion vectors,
selecting, in a binarization, the motion vector from the sorted motion vectors, and
substituting the motion vector, which is selected in the binarization, with a non-selected motion vector of the sorted motion vectors or a predetermined motion vector; and
distributing the motion vector, which is substituted as a result of the filtering, over at least a portion of the second image frame, wherein
the method is operable to receive and process the motion vector fields, and output the predominant predictor fields.

13. A method for processing video signals comprising:
a video processing receiving and processing input video signals and motion vector fields, and outputting video signals; and
a method according to claim 12 for receiving and processing input video signals, and outputting motion vector fields.

14. An apparatus to perform motion estimation of a first image frame and a second image frame, to estimate a motion vector correlating a portion of pixels of the first and second image frames, the first and second image frames being part of an image frame sequence, the apparatus comprising:
a predominant motion detector configured to generate a global motion vector based on a previously determined motion vector, the previously determined motion vector correlating a portion of pixels of earlier image frames of the image frame sequence; and
a motion estimator configured to estimate the motion vector on the basis of the global motion vector,
the predominant motion detector comprising:
a histogram device configured to form a histogram on the basis of the motion vector,
a filtering device configured to filter the motion vector, from among a plurality of motion vectors, based on the histogram, the filtering device comprising:
a sorting device configured to sort the motion vectors,
a binarization device configured to select the motion vector from the sorted motion vectors, and
a substitution device operable to substitute the motion vector, which is selected by the binarization device, with a non-selected motion vector of the sorted motion vectors or a predetermined motion vector, and
a distribution device configured to distribute the motion vector, which is substituted by the filtering device, over at least a portion of the second image frame.

15. An apparatus according to claim 14, wherein the histogram, filtering, and distribution devices are configured to perform respective functions in relation to at least one characteristic of the motion vector, the characteristic being represented by the histogram.

16. An apparatus according to claim 14, wherein the motion vector describes a change of pixel characteristics between two frames.

17. An apparatus according to claim 14, wherein the distribution device is configured to use a predominant predictor field describing a global motion of the at least a portion of the second image frame.

18. An apparatus according to claim 14, wherein the histogram device comprises:
a histogram calculation device configured to process the motion vector into a histogram; and
a histogram analysis device configured to extract characteristics out of the histogram.

19. An apparatus according to claim 14, wherein the binarization device is configured to select by a filtering parameter.

20. An apparatus according to claim 14, wherein the distribution device is configured to distribute a plurality of filtered motion vectors spatial equally.

21. An apparatus according to claim 14, further comprising:

a segmentation device configured to detect at least one segment of an image frame,
wherein the at least one segment is characterized by a specific distribution of motion vectors or pixel characteristics.

22. An apparatus according to claim 14, further comprising:
a motion model classification device configured to detect motion models of motion vectors.

23. An apparatus according to claim 22,
wherein the motion models comprise tilting, panning, zooming, rotations, chaotic, and/or complex motions.

24. An apparatus according to claim 21, wherein the distribution device is configured to distribute motion vectors dependent on maximum occurrences of the motion vector or on a segment or on a calculation per position.

25. An apparatus operable to process video signals into motion vector fields comprising:
a motion estimation device configured to receive and process input video signals and predominant predictor fields, and output motion vector fields; and
a predominant motion detection device configured to generate a global motion vector based on a previously determined motion vector, the previously determined motion vector correlating a portion of pixels of earlier image frames of the image frame sequence, the predominant motion detector comprising:
a histogram device configured to form a histogram on the basis of the motion vector;
a filtering device configured to filter the motion vector on, from among a plurality of motion vectors, based on the histogram, the filtering device comprising:
a sorting device configured to sort the motion vectors,
a binarization device configured to select the motion vector from the sorted motion vectors, and
a substitution device configured to substitute the motion vector, which is selected by the binarization device, with a non-selected motion vector of the sorted motion vectors or a predetermined motion vector; and
a distribution device configured to distribute the motion vector, which is substituted by the filtering device, over at least a portion of the second image frame, wherein
the apparatus is operable to receive and process the motion vector fields, and output the predominant predictor fields.

26. A system to process video signals comprising:
a video processing device to receive and process input video signals and motion vector fields, and output video signals; and an apparatus according to claim 25, wherein the apparatus is configured to receive and process input video signals, and output motion vector fields.

* * * * *